United States Patent [19]
Goldstein et al.

[11] Patent Number: 5,982,554
[45] Date of Patent: Nov. 9, 1999

[54] BRIDGING APPARATUS AND METHOD FOR AN OPTICAL CROSSCONNECT DEVICE

[75] Inventors: Evan Lee Goldstein, Princeton; Lih-Yuan Lin, Middletown; Jane Marie Simmons, Eatontown, all of N.J.

[73] Assignee: AT&T Corp, New York, N.Y.

[21] Appl. No.: 09/001,675

[22] Filed: Dec. 31, 1997

[51] Int. Cl.$^6$ ............................. G02B 27/10; G02B 27/14
[52] U.S. Cl. ............................................ 359/629; 359/618
[58] Field of Search ................................... 359/629, 627, 359/618, 628

[56] References Cited

U.S. PATENT DOCUMENTS

| 3,648,050 | 3/1972 | Koo | 250/208 |
|---|---|---|---|
| 4,283,115 | 8/1981 | Fraissl | 350/171 |

OTHER PUBLICATIONS

Hiroshi Toshiyoshi and Hiroyuki Fujita, "Electrostatic Micro Torsion Mirrors for an Optical Switch Matrix", Journal of Microelectromechanical Systems, vol. 5, No. 4, Dec., 1996, pp. 231–237.

*Primary Examiner*—Georgia Epps
*Assistant Examiner*—Saeed Seyrafi

[57] ABSTRACT

A bridging apparatus is used with an optical matrix crossconnect mechanism that has an array of reflective panels that are disposed in a plurality of columns and rows and are selectively operative between reflective states and non-reflective states. The bridging apparatus includes at least one light beam splitting device that is peripherally disposed in the array of reflective panels adjacent to an entry position of a light beam. The at least one light beam splitting device is operative in a retracted state to permit the light beam to enter into the optical matrix crossconnect mechanism in an undivided manner. The at least one light beam splitting device is operative in a beam splitting state so that the light beam entering into the optical matrix crossconnect mechanism can be divided into a first light beam portion and a second light beam portion which are directed into the optical matrix crossconnect mechanism in different directions.

14 Claims, 7 Drawing Sheets

5,982,554

BRIDGING APPARATUS AND METHOD FOR AN OPTICAL CROSSCONNECT DEVICE

BACKGROUND OF THE INVENTION

1. Field of Invention

The present invention is directed to a bridging apparatus for use with an optical crossconnect device. More particularly, the present invention relates to a bridging apparatus that splits a light beam being inputted into the optical crossconnect device into first and second light beam portions.

2. Description of Related Art

Many telecommunications companies have constructed ground-based telecommunications networks throughout the world. As is commonly known in telecommunications networks art, a plurality of switching stations are interconnected by trunk lines. Occasionally, a trunk line fails as a result of a natural disaster or other event. When a trunk line fails, the communication signals must be rerouted through alternative operating trunk lines.

When a trunk line fails, communications, at least briefly, are interrupted. Upon repair of the failed trunk line, it is often desirable to switch back to the original trunk line after it is repaired. This process, commonly referred to as "restoration," causes yet another, although brief, communications interruption when switching from the alternate trunk line back to the original trunk line. In the communications industry, it is desirable to minimize any interruptions of communications.

Many ground-based communications networks use fiber optic cables. To facilitate switching at the switching stations, optical crossconnect devices are used. A crossconnect device 2 as shown in FIG. 1 represents a conventional crossconnect device that includes a plurality of optical switches 4 that are arranged in a plurality of rows and columns. Each optical switching device 4 includes a reflective panel 6 that moves between a reflective state and a non-reflective state by an actuator 8. For further information regarding crossconnect devices, refer to "An Introduction to Photonic Switching Fabrics" by H. Scott Hinton, published by Plenum Press in New York and an article in the Journal of Microelectromechanical Systems, vol. 5, no. 4, December, 1996, entitled "Electrostatic Micro Torsion Mirrors for an Optical Switch Matrix" by Hiroshi Toshiyoshi and Hiroyuki Fujita. The crossconnect device 2 includes light signal ports 1in–4in and light output ports 1out–4out. By way of example only, a light beam L is emitted from light input port 1in and is reflected from the reflective panel 6 drawn phantomly of an optical switching device 4 located in column C1 and row R2. The light beam L is redirected from its first optical path onto a second optical path to the light output port 2out. A fiber optic cable from an incoming trunk line is connected to the light input ports 1in–4in and fiber optic cables are also connected to the light output ports 1out–4out which are connected to various outgoing trunk lines.

If the outgoing trunk line connected to the light output port 2out fails, it would be desirable to redirect the light beam L to another light output port connected to a different operating trunk line, for example, by using light output port 3out. To switch the light beam L from light output port 2out to light output port 3out, the reflective panel 6 of the optical switching device located in column C1 and row R2 must move to the non-reflective state while the reflective panel 6 in column C1 and row R3 moves to the reflective state.

When the outgoing trunk line connected to the light output port 2out fails or is otherwise rendered inoperative, interruption occurs in the communication. By redirecting the light beam L to the light output port 3out which is connected to a different trunk line than the light output port 2out, communications is now restored. Often, it is desirable to switch back to the original outgoing trunk line once it becomes operative. To switch back from the light output port 3out to the light output port 2out, an interruption again occurs in the communication.

It is desirable in the communication industry to minimize any interruptions during communications. The present invention addresses this concern.

SUMMARY OF THE INVENTION

The bridging apparatus of the present invention divides an incoming light beam into two output light beams. The bridging apparatus of the present invention can be used to assure virtually no interruption during a communication in the event one of the trunk lines fails. Also, the bridging device of the present invention can be used to prevent interruption in communications when the light signal previously switched onto an alternative outgoing trunk line is restored to the original trunk line after repair. The bridging apparatus of the present invention is used with an optical matrix crossconnect mechanism that has an array of reflective elements disposed in a plurality of columns and rows. The array of reflective elements are selectively operative to move between reflective states and non-reflective states.

The bridging apparatus of the present invention includes a light beam splitting device that is peripherally disposed in the array of reflective elements adjacent an entry position of a light beam. The light beam splitting device moves between a retracted state and a beam splitting state. In the retracted state, the light beam enters into the optical matrix crossconnect mechanism. In the beam splitting state, the light beam is divided into a first light beam portion and a second light beam portion. In cooperation with at least one of the array of reflective elements being in the reflective state, the first light beam portion and the second light beam portion are directed into the optical matrix crossconnect mechanism in different directions.

A second embodiment of the bridging apparatus of the present invention includes a first series of at least one first light beam splitting element and a plurality of first bridging reflective elements. A third embodiment of the bridging apparatus of the present invention includes the first series and a second series of at least one second light beam splitting element and a plurality of second bridging reflective elements.

BRIEF DESCRIPTION OF THE DRAWINGS

The invention is described in detail with reference to the following figures wherein like numerals reference like elements, and wherein.

DETAILED DESCRIPTION OF PREFERRED EMBODIMENTS

Figure 1:
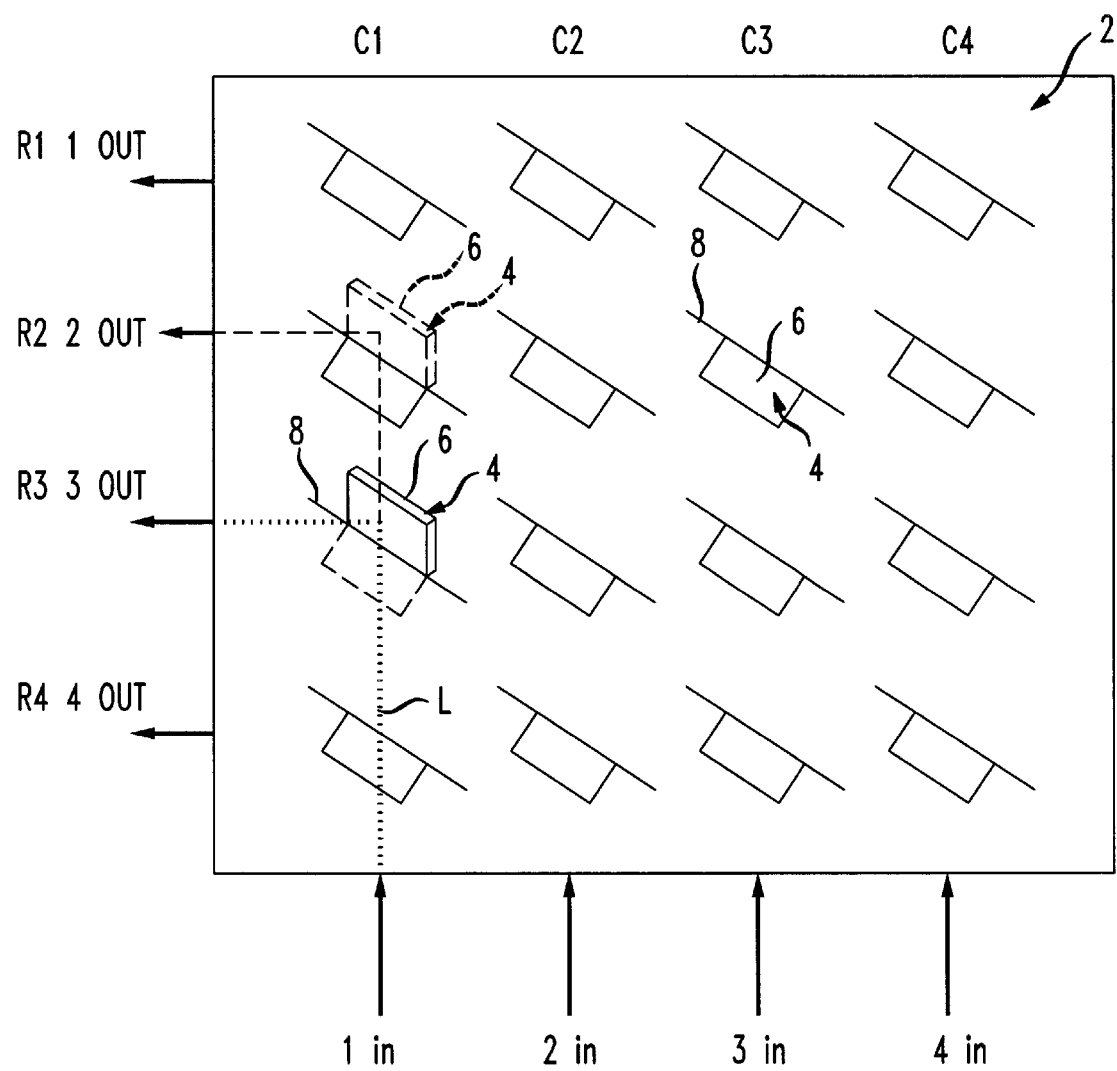
FIG. 1 is a diagrammatic view of a conventional crossconnect device.
Figure 2:
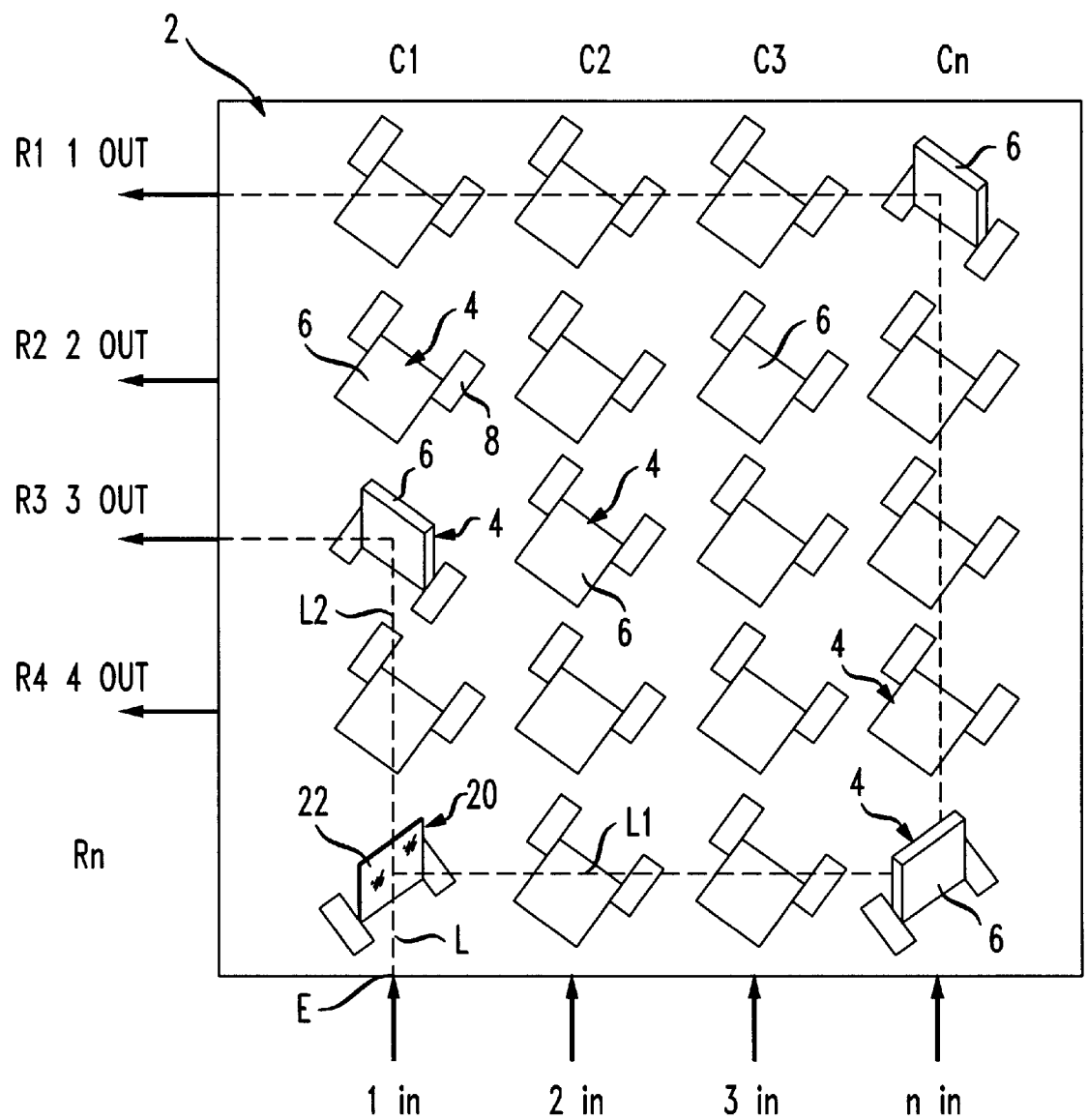
FIG. 2 is a diagrammatic view of first embodiment of a bridging apparatus used with a conventional optical matrix crossconnect device.
Figure 3:
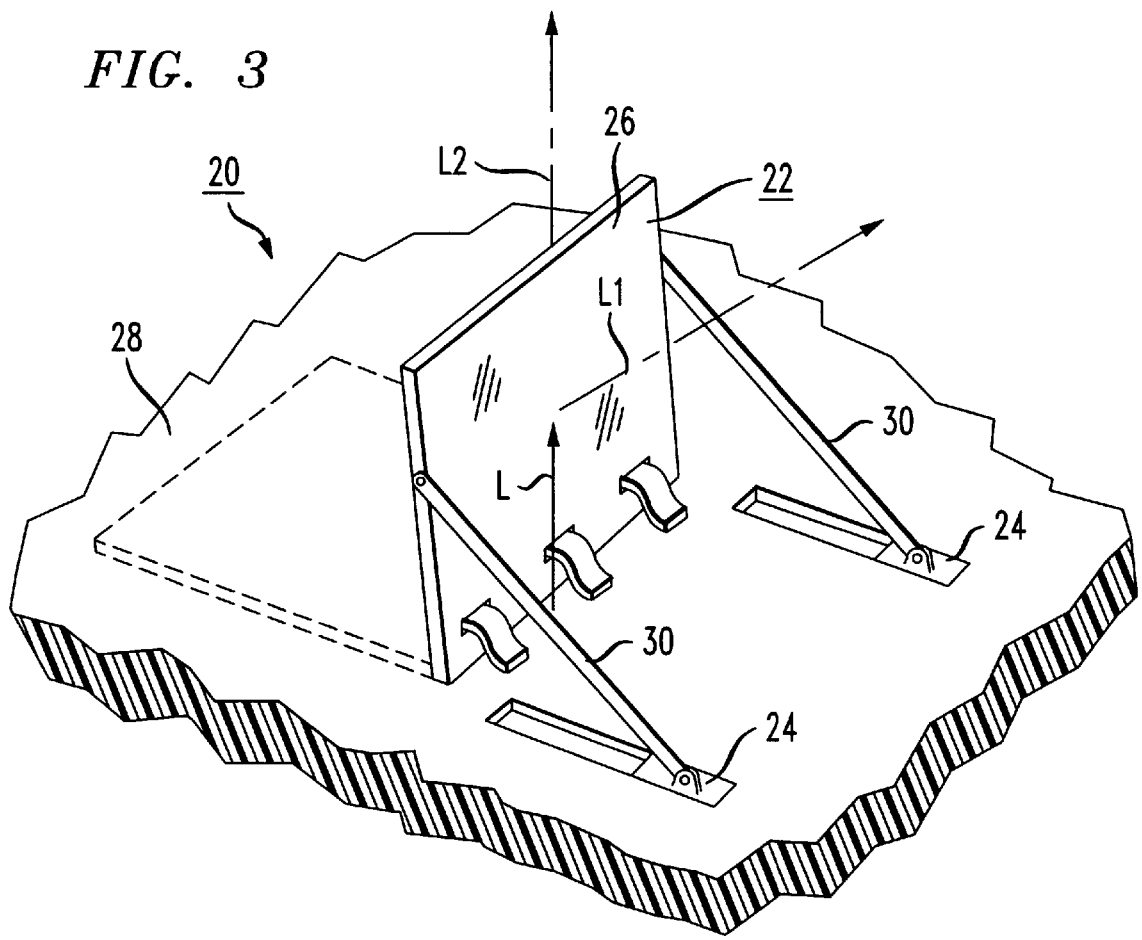
FIG. 3 is an enlarged perspective view of the bridging apparatus of the present invention.
Figure 4:
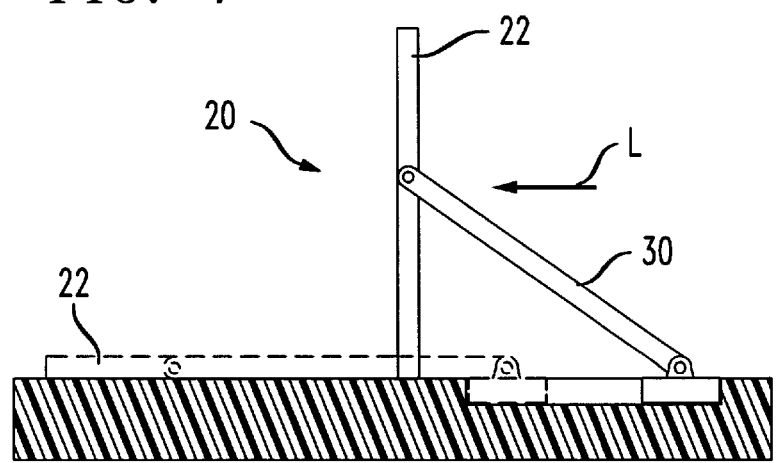
FIG. 4 is a side view in elevation illustrating a retracted state (drawn in phantom) and a beam splitting state of the bridging apparatus of the present invention.

A bridging apparatus 20 of the present invention is generally introduced in FIGS. 2–4. The bridging apparatus 20 of the present invention is used with a conventional optical matrix crossconnect mechanism 2. The conventional optical matrix crossconnect mechanism 2 has an array of optical switching devices 4 disposed in a plurality of columns C1–Cn and rows R1–Rn. Each of the optical switch devices 4 includes a reflective panel 6 also disposed in the plurality of columns C1–Cn and rows R1–Rn. As known in the art, the array of reflective panels 6 are selectively operative to move between reflective states and non-reflective states.

As best shown in FIG. 2, the bridging apparatus 20 of the present invention includes one light beam splitting device 22 which is disposed peripherally in the array of reflective panels 6. Although not by way of limitation, the bridging apparatus 20 is disposed in column C1 and row Rn. Additionally, the light beam splitting device 22 is disposed adjacent an entry position E of a light beam L that is emitted from a light input port 1in. A skilled artisan would appreciate that the entry position E along with the light input port 1in is used by way of example only and that other entry positions for the light beam L can be used, for example, at light input ports 2in–nin as shown in FIG. 2.

In FIGS. 3 and 4, the light beam splitting device 22 is operative to move to and between a retracted state (drawn in phantom in FIG. 4) and a beam splitting state (shown upright relative to the retracted state in FIG. 4). In the retracted state, the light beam splitting device permits the light beam L to enter into the optical matrix crossconnect mechanism without any interference. In the beam splitting state, the light beam L, as shown in FIGS. 2 and 3, is divided into a first beam portion $L_1$ and a second light beam portion $L_2$. Thereafter, the first light beam portion $L_1$ and the second light beam portion $L_2$ are directed into the optical matrix crossconnect mechanism 2 in different directions.

As best shown in FIG. 2, the light beam splitting device 22 works in cooperation with three reflective panels 6 in the reflective state. However, a skilled artisan would appreciate that at least a selected one of the array of reflective panels 6 in the reflective state is required to operate the present invention. By way of example only and not be way of limitation, the light beam portion $L_1$ is redirected by the reflective panel 6 located at column Cn and row Rn in the reflective state which, in turn, is redirected to the reflective panel 6 located at column Cn and row R1 in the reflective state. The reflective panel 6 located at columns Cn and row R1 then redirects the light beam $L_1$ to the light output port 1out. The light beam portion $L_2$ from the light beam splitting device 22 is reflected by the reflective panel 6 located in column $C_1$ and row $R_3$ in the reflective state. The reflective panel 6 located at column $C_1$ and row $R_3$ is then redirected to the light output port 3out.

In essence, the first light beam portion $L_1$ and the second light beam portion $L_2$ provide a light signal redundancy in the communications network. In the event of trunk line failure, for example, in light output port 3out, the light beam portion $L_1$ maintains the communication without interruption provided that there is no failure in the trunk line connected to the light output port 1out. Further, in the event of restoration from an alternate trunk line that was used as a substitute for an original trunk line that failed, restoration to the original trunk line can be implemented using the bridging apparatus 20 of the present invention without any interruption in communications.

As best shown in FIG. 3, the light beam splitting device 22 includes an actuator 24 and a panel member 26. The panel member 26 is hingedly connected to a base member 28. A pair of connecting rods 30 are pivotally connected to and between the panel member 26 and the actuator 24. By way of example, the actuator 24 is a pair of conventional scratch drive actuator mechanisms. Again, with reference to FIG. 3, the actuator 24 is slidably movable relative to the base member 28 so that the panel member 26 can move to and between the retracted state and the beam splitting state.

As shown in FIG. 3, the panel member 26 is fabricated from a semi-transparent, semi-reflective material. It is preferred that the semi-transparent, semi-reflective material reflects approximately fifty percent of the light beam L to yield the first light beam portion $L_1$ and permits approximately fifty percent of the light beam L to pass through the panel member 26 to yield the second light beam portion $L_2$. Also, as shown in FIG. 2, the light beam splitting device 20 is disposed adjacent the reflective panels 6 located at column C1 and row R4, and column C2 and row $R_n$.

Figure 5A:
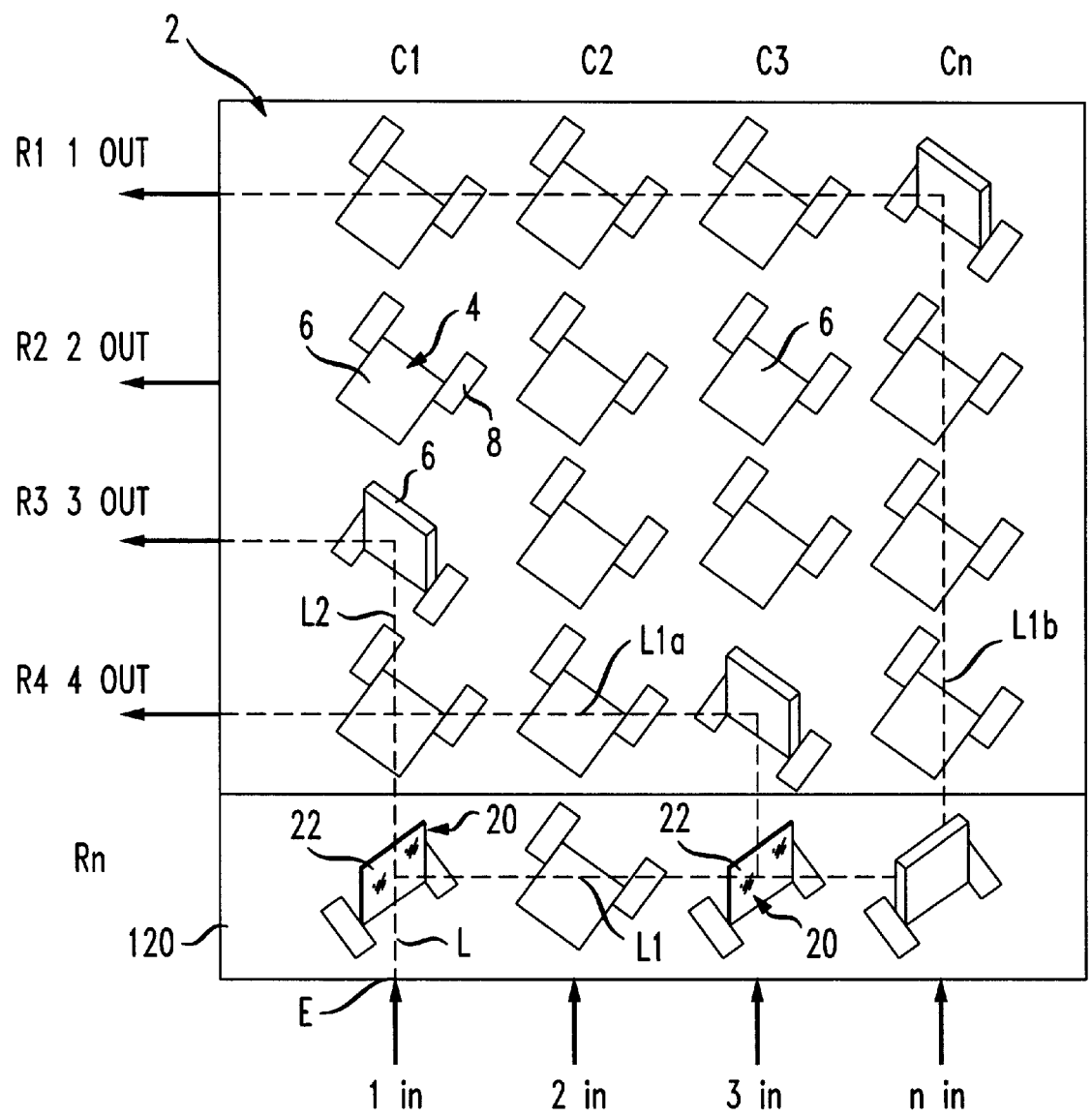
FIG. 5A is a second exemplary embodiment of the bridging apparatus of the present invention illustrated with a conventional optical matrix crossconnect device splitting a light beam into three light beam portions.

A second embodiment of the bridging apparatus 120 used with the crossconnect device 2 is illustrated in FIG. 5A. In this second embodiment, two light beam splitting devices 22 are disposed in row Rn. Although not by way of limitation, one light beam splitting device 22 is positioned in column C1 and row Rn while the remaining one of the light beam splitting devices 22 is located at column C3 and row Rn. The primary difference between the first embodiment of the bridging apparatus 20 of the present invention and the second embodiment of the bridging apparatus 120 is that the second embodiment introduces another light beam splitting device along row Rn. Depending upon whether the reflective panel 6 located at column C2 and row Rn is in the reflective state or the non-reflective state, the second embodiment of the bridging apparatus 120 can either divide one beam into three light beam portions or individually divide two input light beams into respective first and second light beam portions.

In FIG. 5A, the reflective panel 6 located at column C2, row Rn is in the non-reflective state. Therefore, the light beam L entering through the light input port 1 in divides in a similar manner as in the first exemplary embodiment of the bridging apparatus 20. However, the first light beam portion L1 divides again into a first light beam subportion L1a and a second light beam subportion L1b. Now, three light beams can be redirected to the light output ports such as 1out, 3out and 4out as shown in FIG. 5A.

Figure 5B:
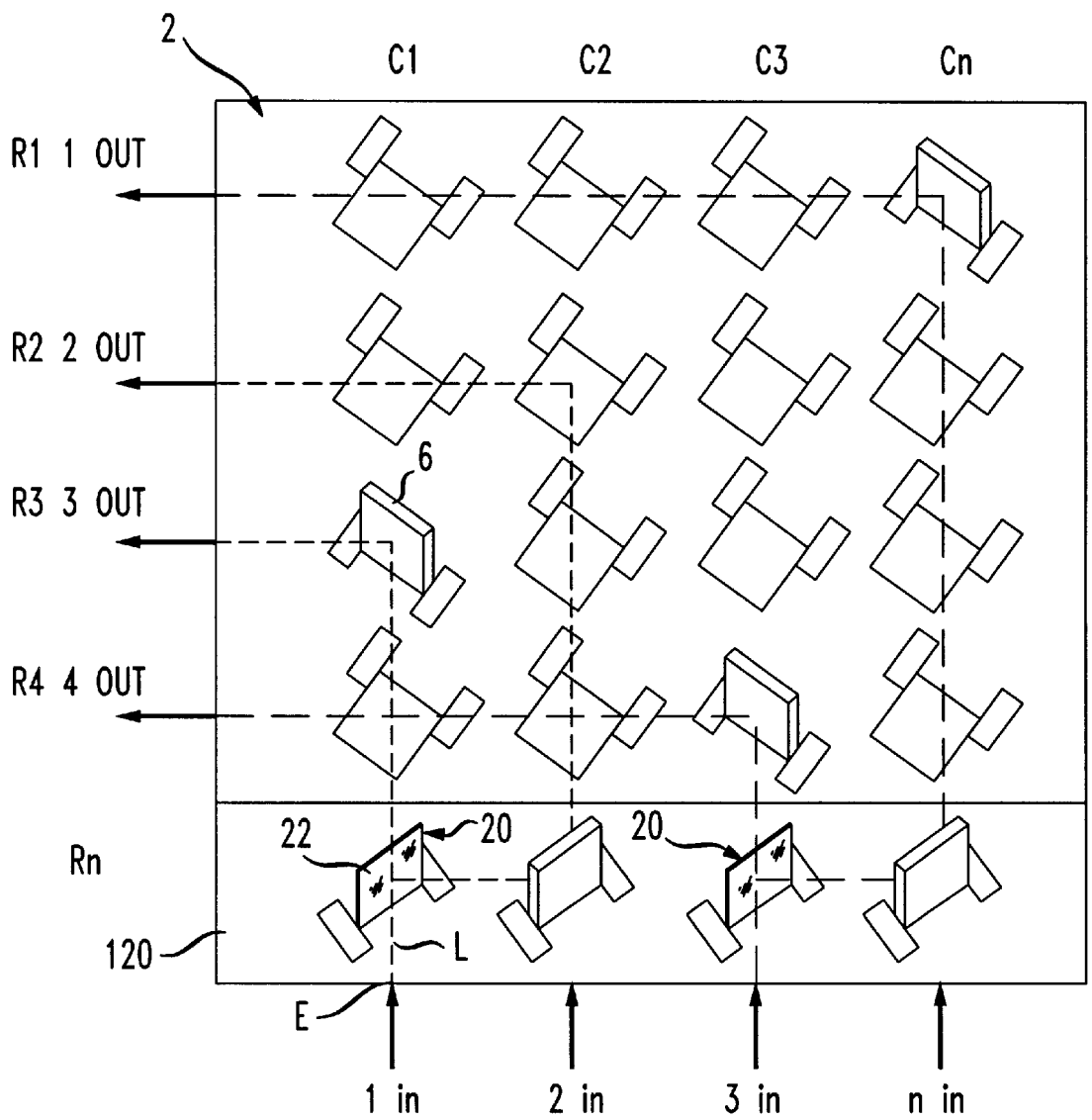
FIG. 5B is the second exemplary embodiment of the bridging apparatus of the present invention used with a conventional optical matrix crossconnect devices splitting two different light beams into respective first and second light beam portions.

With reference to FIG. 5B, two individual light beams inputted at, for example, light input ports 1in and 3in are divided into respective ones of first and second light beam portions. This second embodiment of the bridging apparatus 120 demonstrates that, with the reflective element located at column C2 and row Rn in the reflective state, multiple input light beams can be divided into respective first and second light beam portions.

Figure 6:
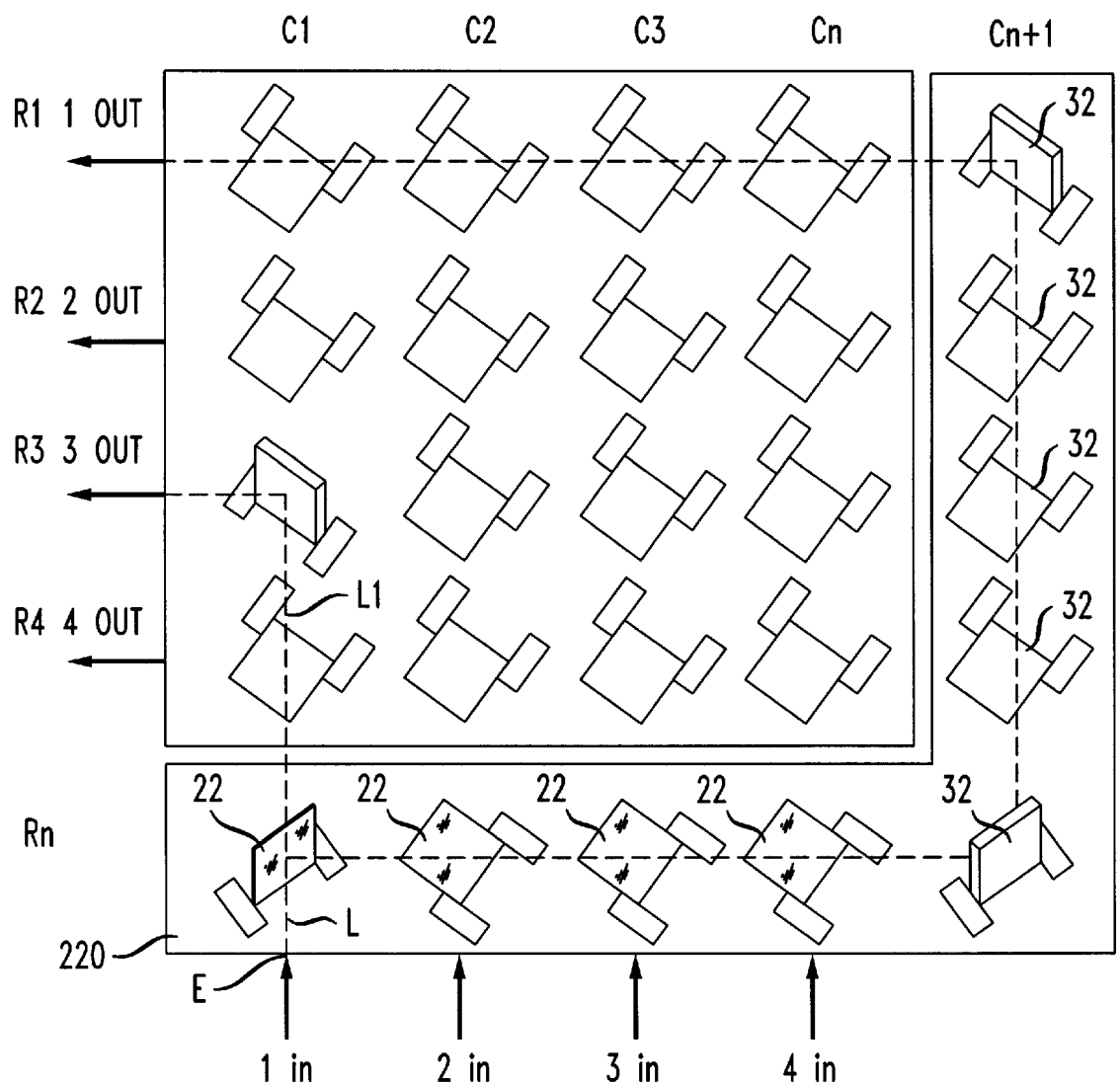
FIG. 6 is a third exemplary embodiment of the bridging apparatus of the present invention used with a conventional optical matrix crossconnect mechanism.

A third exemplary embodiment of the bridging apparatus 220 is introduced in FIG. 6. Although not by way of limitation, the third exemplary embodiment of the bridging apparatus 220 divides a light beam that is entering into the optical matrix crossconnect mechanism 2 at light input port 1 in. The third embodiment of the bridging apparatus 220 of the present invention includes a plurality of first light beam splitting devices 22 and a plurality of first bridging reflective panels 32 which is defined as a first series. The first series of the first light beam splitting devices 22 and the plurality of first bridging reflective panels 32 are arranged peripherally and in optical alignment along column Cn+1 and row Rn. Specifically, each of the plurality of the first light beam splitting devices 22 is disposed adjacent to respective ones of the light input ports 1 IN–4 IN. As described above, each of the first light beam splitting device 22 is movable between the retracted state so that the light beam L is permitted to enter in an undivided manner at the light input port 1 IN and into the optical matrix crossconnect mechanism 2 and a beam splitting state in which the entering light beam L is divided into the first light beam portion L1 and the second light beam portion L2. However, as shown by way of example, the first light beam portion L1 is directed into the optical matrix crossconnect mechanism 2 while the second light beam portion L2 is directed to at least one bridging reflective panel 32 that is disposed in a bridging reflective state such as the bridging reflective panels 32 located in column Cn+1, row R1 and column Cn+1 and row Rn. The second light beam portion L2 is directed to two of the bridging reflective panels 32 before the second light beam L2 portion is directed into the optical matrix crossconnect mechanism 2 which, in this case, is to the light output port 1out. The first light beam portion L1 is redirected to the light output port 3out as shown by the example in FIG. 6.

The third exemplary embodiment of the bridging apparatus 220 assures that light beams can be inputted through the light input ports 1in–4in while at least the light beam input at light input port 1in can be divided before entering into the optic matrix crossconnect mechanism 2.

Figure 7:
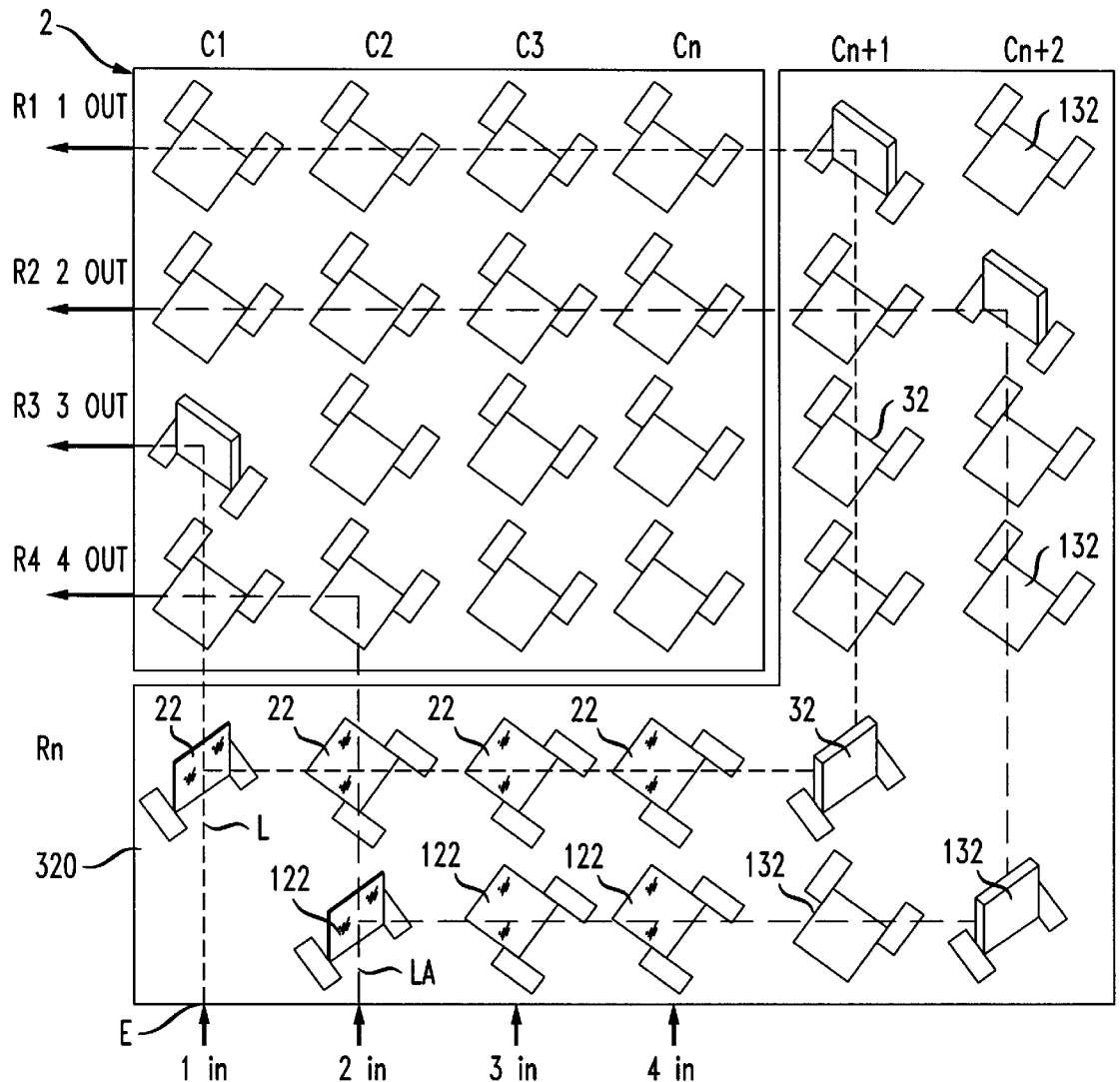
FIG. 7 is a fourth exemplary embodiment of the bridging apparatus of the present invention used with a conventional optical matrix crossconnect device.

A fourth exemplary embodiment of the bridging apparatus 320 is introduced in FIG. 7. Like the third embodiment of the bridging apparatus of the present invention, the fourth exemplary embodiment of the bridging apparatus includes the first series of the plurality of the first light beam splitting devices 22 and the plurality of first bridging reflective panels 32. Additionally, the bridging apparatus 320 includes a second series of a plurality of second light beam splitting devices 122 and a plurality of second bridging reflective panels 132. The second light beam splitting devices 122 and the second bridging reflective panels 132 are disposed peripherally in optical alignment along the first series of the first light beam splitting device 22 and the plurality of first bridging reflective panels 32. As shown by way of example the second series divides a second light beam LA entering into the optical matrix crossconnect mechanism 2 at light input port 2 in. With this arrangement, two light beam inputs, in this instance, at light input ports 1in and 2in, can be divided into respective first and second light beam portions.

For the fourth exemplary embodiment of the bridging apparatus 320 of the present invention, the first light beam splitting device 22 is offset from the second light beam splitting device 122 by a single column. The fourth exemplary embodiment of the bridging apparatus 320 permits light beams to enter from all light beam input ports 1in–4in while two of the entering light beams from light input ports 1in and 2in can be divided into respective first and second light beam portions.

Based on the four exemplary embodiments of the bridging apparatus described above, a method for simultaneously providing two output light signals from a single input light signal is achieved. The first step of the method is splitting the input light signal into a first light signal portion and a second light signal portion. The next step is directing the first light signal portion in a first direction and a second light portion into a second direction which is different from the first direction. The third step is receiving the first light signal portion at a first light signal output port and the second light signal portion at a second light signal output port which is different from the first light signal output port.

Practicing the bridging apparatus of the present invention minimizes communication interruption. The bridging apparatus of the present invention is particularly useful when restoring communications from a substitute trunk line to the original trunk line without any interruption in communications because identical communication signals exist temporarily during the transition from the substitute trunk line to the original trunk line. Also, the bridging apparatus of the present invention can provide redundancy in communications which assures no interruption in communication should one of the trunk lines fail.

Although not by way of limitation, an exemplary embodiment of the present invention can incorporate an optical switch device or optical switch devices as described in a co-pending patent application filed concurrently with the present application, entitled "Fiber-Optic Free-Space Micromachined Matrix Switches" and identified under attorney docket number JAO 37661.

Although the invention has been described in connection with the exemplary embodiments, it should be appreciated that modifications or changes may be made to the exemplary embodiments of the invention without departing from the inventive concepts contained herein and defined by the following claims.

What is claimed is:

1. An optical matrix crossconnect mechanism comprising:
    at least one reflective panel disposed in an array of a plurality of columns and rows, each reflective panel being selectively operative between a reflective state and a non-reflective state; and
    a bridging apparatus including at least one light beam splitting device disposed in the array, the at least one light beam splitting device operative in a retracted state wherein no portion of the light beam is reflected and a beam splitting state wherein the light beam is divided into a first light beam portion and a second light beam portion which are directed in different directions.

2. The optical matrix crossconnect mechanism according to claim 1, wherein the at least one light beam splitting device includes an actuator and a panel member movable between the retracted state and the beam splitting state by the actuator.

3. The optical matrix crossconnect mechanism according to claim 1, wherein the panel member is fabricated from a semi-transparent, semi-reflective material.

4. The optical matrix crossconnect mechanism according to claim 3, wherein the semi-transparent, semi-reflective material reflects approximately 50% of the light beam and permits approximately 50% of the light beam to pass through the beam splitting device.

5. The optical matrix crossconnect mechanism according to claim 1, wherein at least one of the reflective panels is disposed adjacent at least one light beam splitting device in one of a row and a column.

6. An optical matrix crossconnect mechanism comprising:
at least one reflective panel disposed in an array of a plurality of columns and rows, each reflective panel being selectively operative between a reflective state and a non-reflective state; and
a bridging apparatus including a first series of at least one first light beam splitting device and at least one first bridging reflective panel, the first series arranged in the array, in a selected column or in a selected row, the at least one first light beam splitting device being movable between a retracted state permitting the light beam to remain undivided and a beam splitting state dividing the light beam into a first light beam portion and a second light beam portion directed in different directions.

7. The optical matrix crossconnect mechanism according to claim 6, further comprising a second series of at least one second light beam splitting device and a plurality of second bridging reflective panels disposed in optical alignment parallel to the first series for selectively dividing a second light beam.

8. The optical matrix crossconnect mechanism according to claim 7, wherein the at least one first light beam splitting device and the at least one second light beam splitting device are offset from one another while being in optical alignment with respective ones of reflective panels.

9. The optical matrix crossconnect mechanism according to claim 6, wherein in at least one second light beam portion is directed to at least one bridging reflective panel in a bridging reflective state.

10. A method for simultaneously providing two output light signals from a single input light signal inputted into an array comprising at least one reflective panel disposed in a plurality of columns and rows, each reflective panel being selectively operative between a reflective state and a non-reflective state, the method comprising the steps of:
splitting the input light signal into a first light signal portion and a second light signal portion;
directing the first light signal portion in a first direction and the second light signal portion into a second direction different from the first direction; and
receiving the first light signal portion at a first light signal output port and the second light signal portion at a second light signal output port different from the first light signal output port.

11. The method according to claim 10, wherein the step of splitting comprises a step of switching at least one light beam splitting device between a retracted state wherein no portion of the light beam is reflected and a beam splitting state wherein the light beam is divided into the first light signal portion and the second light signal portion.

12. The method according to claim 10, further comprising a step of reflecting the second light signal portion by switching at least one light beam reflective panel between a retracted state wherein the second light signal portion is not reflected and a reflective state wherein the second light signal portion is reflected.

13. The method according to claim 10, further comprising the steps of:
inputting a second input light signal,
splitting the second input light signal into a third light signal portion and a fourth light signal portion;
directing the third light signal portion in a third direction and the fourth light signal portion into a fourth direction different from the third direction.

14. The method according to claim 13, wherein, the first and the third directions are parallel to each other and the second and fourth directions are parallel to each other.

\* \* \* \* \*